Patented May 1, 1934

1,956,972

UNITED STATES PATENT OFFICE 1,956,972

SECONDARY BUTYL LACTATE

Shailer L. Bass and Howard N. Fenn, Midland, Mich., assignors to Commercial Solvents Corporation, Terre Haute, Ind., a corporation of Maryland No Drawing. Application September 28, 1932, Serial No. 635,229

1 Claim. (Cl. 260—106)

The present invention regards a new compound, a secondary butyl lactate, which is the ester of secondary butyl alcohol and alpha-hydroxy propionic acid (lactic acid), and relates to methods of preparing said compound.

We have prepared the aforementioned compound by two methods, determined certain physical properties thereof whereby it may readily be identified, and have discovered that it may advantageously be used as a solvent in the preparation of certain lacquers, particularly lacquers comprising cellulose esters, and more particularly nitrocellulose. To the accomplishment of the foregoing and related ends, the invention, then, consists of the new compound, together with methods of preparing the same, hereinafter fully described and particularly pointed out in the claims, the following description setting forth in detail several of the various ways in which the principle of the invention may be realized.

We have found that secondary butyl lactate can be prepared in good yields by reacting secondary butyl alcohol and lactic acid in the presence of a suitable acid catalyst capable of promoting the alcoholysis of intermolecular esters of lactic acid, e. g. lactyl-lactic acid and/or lactides. We have also found that the foregoing reaction can be carried out under pressure at temperatures in the range between about 100° and about 200° C. without a catalyst but that the yields of the lactate obtained are not as good as when the catalyst is used. We have determined that salts of lactic acid, preferably the sodium salt, may be substituted for the lactic acid in the foregoing reaction and that equally good yields of the secondary butyl ester will be obtained. Among the acid catalysts, we prefer to use substantially anhydrous hydrogen chloride but we may employ hydrogen bromide, concentrated sulphuric acid, sulphonic acids such as para-toluene sulphonic acid or diphenyl sulphonic acid, or any other suitable acid catalyst capable of promoting the alcoholytic reaction.

The properties of secondary butyl lactate are as follows:—It is a water-white liquid possessing a faint ethereal fruity odor, only slightly soluble in water with such aqueous solution showing a neutral reaction with methyl orange, boiling at 172° C. at atmospheric pressure, at 75°–76° C. at 20 millimeters absolute mercury pressure, and 59°–60° C. at 12 millimeters absolute pressure, and its density is 0.9720 at 20° C. compared to water at 4° C. The ester is soluble in or miscible with a great variety of organic liquids such as the aromatic hydrocarbons and their chlorinated derivatives, aliphatic alcohols, and aliphatic esters of fatty acids.

We will now describe the preparation of the ester in the presence of an acid catalyst. An aqueous solution weighing 106 grams and containing 85 per cent by weight of lactic acid and 600 grams of substantially anhydrous secondary butyl alcohol were placed in a distilling flask provided with a stirrer, a short fractionating column, and a condenser. The liquid mixture was distilled until the temperature of the vapors at the top of the fractionating column reached 99° C. During this distillation most of the water was removed at 88.5° C. as a constant boiling mixture consisting of 32 percent water and 68 per cent secondary butyl alcohol by weight. Sufficient anhydrous secondary butyl alcohol was then added to the residual solution in the distilling flask to give a ratio of 5 moles of alcohol to 1 mole of lactic acid therein. The fractionating column was then replaced by a condenser so arranged as to condense the vapors and return them to the flask. Provision was made for bubbling dry hydrogen chloride gas through the liquid mixture which was stirred and heated at refluxing temperature, i. e. about 104° C. for two hours. At the end of this period the addition of the hydrogen chloride was discontinued and the solution refluxed for two hours more. The reaction mixture was then distilled, first at atmospheric pressure to recover the excess secondary butyl alcohol, and then under vacuum to recover the secondary butyl lactate. A yield of 111.5 grams, or 76 per cent of theoretical was obtained. The second butyl alcohol recovered was purified and dried for reuse.

Runs substantially similar to that just described were made employing concentrated sulphuric acid and para-toluene sulphonic acid. The following yields were obtained, respectively, 70 per cent and 75 per cent of theoretical. When sulphuric acid is utilized as a catalyst care must be exercised to neutralize the sulphuric acid before distilling the reaction mixture in order to prevent decomposition therein by reaction of the sulphuric acid therewith.

As an example of the preparation of secondary butyl lactate without the use of a catalyst but under pressure, we placed 252.7 grams of anhydrous lactic acid and 622.0 grams of secondary butyl alcohol in an iron rotating bomb. The contents of the bomb were heated at a temperature between about 170° and about 175° C. for a period of four hours under the vapor pressure of the reactants at that temperature. The reaction mixture was then removed from the bomb and fractionated whereby 170.0 grams of secondary butyl lactate was obtained. This amount corresponded to 41.5 per cent of the yield theoretically obtainable.

In order to determine whether the presence of a catalyst would have an effect upon the unreacted residue from the foregoing run we returned the residue to the bomb along with 1 per cent of its total weight of dry hydrogen chloride. The contents of the bomb were then heated for three and one-half hours at a temperature between about 170° and about 175° C. The content of the bomb was then removed and fractionated whereby 115 grams of secondary butyl lactate was obtained. This increased the yield to approximately 70 per cent of theoretical showing that the presence of the catalyst exercised a distinctly beneficial effect upon the yield.

The hereinbefore described solvent properties of our new compound and its low rate of evaporation combine to make secondary butyl lactate a valuable constituent for the preparation of many lacquers.

Other modes of applying the principle of our invention may be employed instead of those explained, change being made as regards the method of preparing the compound herein disclosed, provided the step or steps stated by any of the following claims or the equivalent of such stated step or steps be employed.

We therefore particularly point out and distinctly claim as our invention:—

Secondary butyl lactate, boiling at 172° C. and having a density of 0.972 at 20° C. compared to water at 4° C.

SHAILER L. BASS.
HOWARD N. FENN.